(12) United States Patent
Hugener et al.

(10) Patent No.: US 11,367,542 B2
(45) Date of Patent: Jun. 21, 2022

(54) FIELD GRADING MEMBERS, POWER CABLES HAVING FIELD GRADING MEMBERS, AND METHODS OF REGULATING ELECTRIC FIELDS

(71) Applicant: Hamilton Sundstrand Corporation, Charlotte, NC (US)

(72) Inventors: Theresa A. Hugener, Coventry, CT (US); Peter J. Walsh, Wethersfield, CT (US); Haralambos Cordatos, Colchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/671,955

(22) Filed: Nov. 1, 2019

(65) Prior Publication Data

US 2021/0134486 A1     May 6, 2021

(51) Int. Cl.
| | | |
|---|---|---|
| *H02G 15/184* | (2006.01) | |
| *H01B 9/00* | (2006.01) | |
| *G05F 1/66* | (2006.01) | |
| *H01B 7/00* | (2006.01) | |

(52) U.S. Cl.
CPC ............... *H01B 9/003* (2013.01); *G05F 1/66* (2013.01); *H01B 7/009* (2013.01); *H01B 9/006* (2013.01)

(58) Field of Classification Search
CPC .................................................. H02G 15/184
USPC ........................................................ 174/73.1
See application file for complete search history.

(56) References Cited

U.S. PATENT DOCUMENTS

| | | | | |
|---|---|---|---|---|
| 3,335,215 | A |   | 8/1967 | Huber |
| 3,499,100 | A | * | 3/1970 | O'Mara ............... H02G 15/184 174/73.1 |
| 3,590,138 | A |   | 6/1971 | Sugimoto et al. |
| 3,761,602 | A | * | 9/1973 | De Sio ................. H02G 15/184 174/73.1 |
| 3,828,114 | A | * | 8/1974 | Priaroggia ........... H02G 15/068 174/73.1 |
| 3,829,600 | A | * | 8/1974 | Portinari .............. H02G 15/184 174/73.1 |
| 4,418,240 | A |   | 11/1983 | Chazelas |
| 5,365,020 | A | * | 11/1994 | Vallauri ................... H01R 4/70 174/73.1 |
| 9,718,365 | B2 | * | 8/2017 | Imahori .................. B60L 50/51 |
| 9,960,541 | B2 | * | 5/2018 | Atkinson ............. H01R 4/4881 |

(Continued)

FOREIGN PATENT DOCUMENTS

| | | |
|---|---|---|
| CH | 631581 A5 | 8/1982 |
| DE | 19547120 A1 | 6/1997 |

(Continued)

OTHER PUBLICATIONS

Extended European Search Report for Application No. 20205249.4 dated Mar. 26, 2021.

*Primary Examiner* — Chau N Nguyen
(74) *Attorney, Agent, or Firm* — Cantor Colburn LLP

(57) ABSTRACT

A field grading member includes an insulating body extending along a regulation axis and a conductive body. The conductive body is encapsulated within the insulating body and defines a conductive network therein to regulate an electric field within an underlying insulator from current flowing through a conductor along the regulation axis. Cables and methods of regulating electric field within cables are also described.

19 Claims, 5 Drawing Sheets

(56) References Cited

U.S. PATENT DOCUMENTS 10,290,392 B2     5/2019   Green et al.
2011/0308857 A1   12/2011   Zapata

FOREIGN PATENT DOCUMENTS

| DE | 102010039750 | * | 3/2012 |
|----|--------------|---|--------|
| JP | 10243540 A   |   | 9/1998 |
| WO | 9921259 A1   |   | 4/1999 |

* cited by examiner

FIELD GRADING MEMBERS, POWER CABLES HAVING FIELD GRADING MEMBERS, AND METHODS OF REGULATING ELECTRIC FIELDS

BACKGROUND

The present disclosure is generally related to electrical power distribution systems, and more particularly to regulating electric fields within cabling carrying electric power in electrical power distribution systems.

Power distribution systems, such as on aircraft, commonly include cabling to convey electric power to various electrical devices connected to the power distribution system. The cabling extends between terminations and joints interconnecting components of the system and generally includes a conductor sheathed within an insulator and reinforced with external shield. The shield typically extends continuously along the length of the insulator and is removed at the joints and terminations for purposes of mechanically connecting the cable to the joint or termination. Removal of the shield interrupts the effect that the shield otherwise provides to the electric field associated with electric current flowing through the cabling. The electric field extends radially through the insulator along the unshielded portion of the cabling and exerts stress on the insulator according to voltage.

In some electric systems the stress can potentially cause electrical breakdown of the insulator. To limit stress in such systems field grading devices can be employed. For example, in high voltage systems, capacitive field grading devices like stress-cones can be attached to the unshielded portion of the cable to limit stress in the underlying insulator. In low and medium voltage applications resistive field grading devices a cylindrical grading element with high conductivity, or field strength-dependent conductivity can be attached to the unshielded cabling portion. Such capacitive and resistive field grading devices limit electrical stress by distributing the electric field along the length of the unshielded portion of the cabling.

Such systems and methods have generally been acceptable for their intended purposes. However, there remains a need in the art for improved field grading members, cable assemblies having field grading members, and methods of regulating electric field in cables.

BRIEF DESCRIPTION

A field grading member is provided. The field grading member includes an electrically insulating body extending along a regulation axis and an electrically conductive body. The electrically conductive body is encapsulated within the electrically insulating body and defines a conductive network that varies in density along the regulation axis therein to regulate an electric field within an underlying cable insulator from current flowing through a cable conductor along the regulation axis.

In addition to one or more of the features described above, or as an alternative, further examples of the field grading member may include that the conductive network includes a wire.

In addition to one or more of the features described above, or as an alternative, further examples of the field grading member may include that the wire is a first wire and that the field grading member has one or more second wire electrically connected to the first wire.

In addition to one or more of the features described above, or as an alternative, further examples of the field grading member may include that the second wire is circumferentially offset from the first wire.

In addition to one or more of the features described above, or as an alternative, further examples of the field grading member may include that the second wire is axially offset from the first wire about the regulation axis.

In addition to one or more of the features described above, or as an alternative, further examples of the field grading member may include that the conductive network includes a branched wire.

In addition to one or more of the features described above, or as an alternative, further examples of the field grading member may include that the branched wire includes a longitudinal member extending longitudinally within the insulating body and along the regulation axis.

In addition to one or more of the features described above, or as an alternative, further examples of the field grading member may include that the branched wire includes a radial member extending radially within the insulating body relative to the regulation axis.

In addition to one or more of the features described above, or as an alternative, further examples of the field grading member may include that the branched wire varies in density along the regulation axis.

In addition to one or more of the features described above, or as an alternative, further examples of the field grading member may include that the density of the branched wire varies according to strength of the electric field within the underlying cable insulator at a rated voltage of cable including the cable insulator.

In addition to one or more of the features described above, or as an alternative, further examples of the field grading member may include that the conductive body includes wire mesh structure.

In addition to one or more of the features described above, or as an alternative, further examples of the field grading member may include that the wire mesh structure varies in density along the regulation axis.

In addition to one or more of the features described above, or as an alternative, further examples of the field grading member may include that the density of the wire mesh structure varies according to strength of the electric field within the underlying cable insulator at a rated voltage of a cable including the cable insulator.

In addition to one or more of the features described above, or as an alternative, further examples of the field grading member may include that the conductive body encapsulated within the electrically insulating body has reduced conductivity relative to a conductive body not encapsulated within the electrically insulating body.

A cable is also provided. The cable includes a cable conductor, a cable insulator extending about the cable conductor, and field grading member as described above. The field grading member overlays the cable insulator and is electrically separated from the cable conductor by the cable insulator to regulate strength of an electric field within the cable and associated with electric current flowing through the cable conductor.

In addition to one or more of the features described above, or as an alternative, further examples of the cable may include a cable shield extending along the regulation axis, the cable shield removed along a portion of the insulator such that the field grading member abuts the cable insulator.

In addition to one or more of the features described above, or as an alternative, further examples may include that the cable includes a termination or a joint, and that the field grading member forms a portion of the termination or the joint of the cable.

A method of regulating an electric field is additionally provided. The method includes flowing current through a conductor along the regulation axis and radially inward of a field grading member as described above, communicating an electric field associated with the current flowing through the cable conductor to a cable insulator underlying the field grading member, and regulating the electric field within the underlying cable insulator with conductivity of the conductive body encapsulated within the insulating body.

In addition to one or more of the features described above, or as an alternative, further examples of the method may include the electric field has an unregulated peak within the cable insulator when the field grading member is spaced apart from the cable insulator, that the electric field has a regulated within the cable insulator when the field grading member abuts the cable insulator, and that the regulated peak is smaller than the unregulated peak.

In addition to one or more of the features described above, or as an alternative, further examples of the method may include that the electric field has an unregulated distribution within the cable insulator when the field grading member is spaced apart from the cable insulator, that the electric field has a regulated distribution within the cable insulator when the field grading member abuts the cable insulator, and that the regulated distribution is more uniform than the unregulated distribution.

Technical effects of the present disclosure include the capability to manufacture field grading members with relatively high non-linearity in the resistivity (or conductivity) as a function of strength of electric associated with current flowing through cable conductor. Technical effects also include the capability to limit electric stress associated with relatively high voltages in cable insulators by regulating the electric field associated with current flowing through an underlying cable conductor. Technical effects also include the capability to tune regulation of the electric field through selection of the shape and/or density of the conductive body encapsulated within the insulating body axially along the cable conductor.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
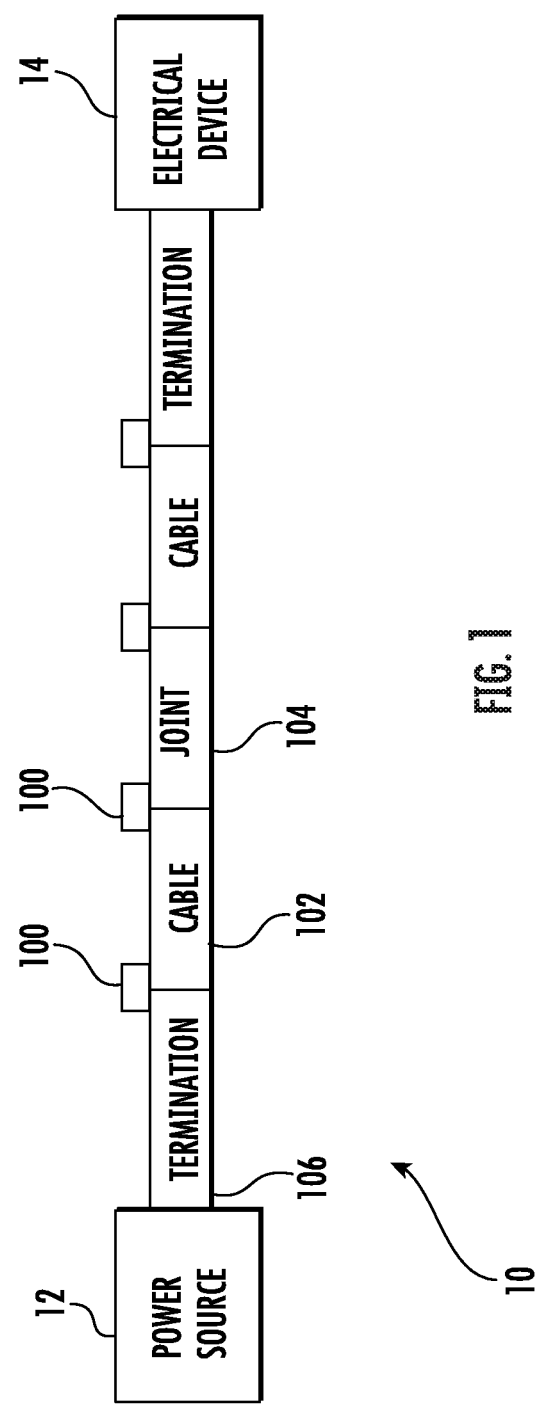
FIG. 1 is a schematic view of power distribution system with a cable constructed in accordance with the present disclosure, showing the cable electrically connecting a power source with an electrical load through a joint and termination each having a field grading body.

Reference will now be made to the drawings wherein like reference numerals identify similar structural features or aspects of the subject disclosure. For purposes of explanation and illustration, and not limitation, a partial view of an exemplary example of a field grading member constructed in accordance with the disclosure is shown in FIG. 1 and is designated generally by reference character 100. Other examples of composite field grading bodies, cables, and methods of regulating electric fields within cable insulators in accordance with the present disclosure, or aspects thereof, are provided in FIGS. 2-7, as will be described. The systems and methods described herein can be used for regulating electric fields within cables, such is within cable terminations and joints as in high voltage aircraft electrical systems, though the present disclosure is not limited to high voltage electrical systems or to aircraft in general.

Referring to FIG. 1, a power distribution system 10 is shown. The power distribution system 10 includes a power source 12, a cable 102, and an electrical device 14. The cable 102 connects the power source 12 to the electrical device 14 through a cable joint 104 and a cable termination 106. One or more of the cable joint 104 and the cable termination 106 includes the field grading member 100. In the illustrated example the cable joint 104 and the cable termination 106 each include, e.g., are each circumferentially surrounded by, the field grading member 100. Although shown and described herein as incorporated in the cable joint 104 or the cable termination 106, it is to be understood and appreciated that the field grading member 100 can also be employed in other locations within the power distribution system 10, such as at locations where the cable 102 has been spliced or repaired by way of non-limiting examples.

In certain examples the power source 12 can be a direct current (DC) power source, and the cable 102 configured to communicate DC power, e.g., DC power at upwards of 6000 volts. It is also contemplated that the power source 12 can be an alternating current (AC) power source, and that the cable 102 by configured to communicate AC power, e.g., upwards of 6000 volts.

Figure 2:
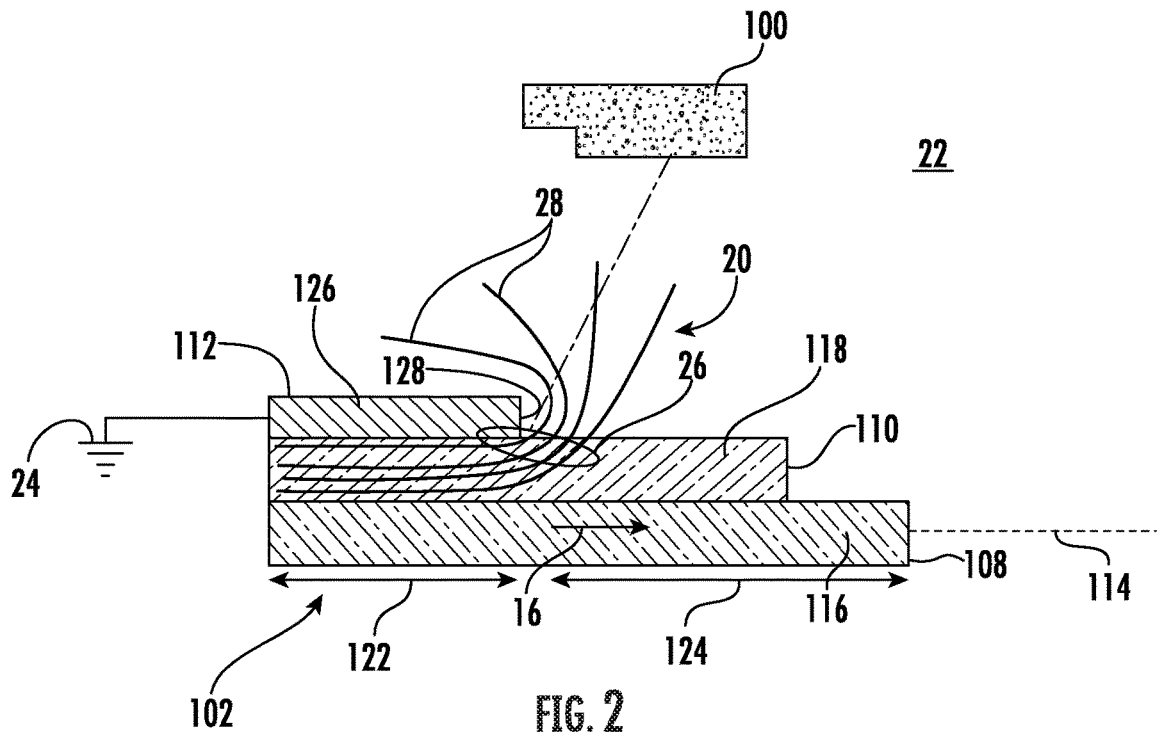
FIG. 2 is a schematic cross-sectional view of shielded and unshielded portions of the cable of FIG. 1, showing electrical stress within the shielded and unshielded portions of the cable when the field grading body is spaced apart from the cable.
Figure 3:
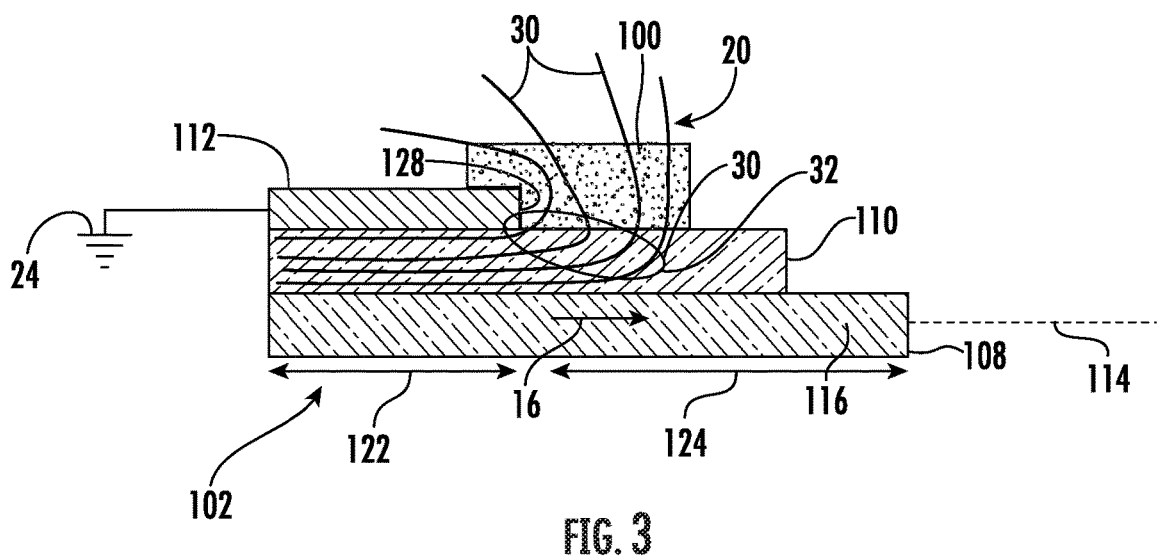
FIG. 3 is a schematic cross-sectional view of shielded and unshielded portions of the cable of FIG. 1, showing electrical stress within the shielded and unshielded portions of the cable when the field grading body abuts the cable.

With reference to FIGS. 2 and 3, the cable 102 is shown with the field grading member 100 spaced apart from the cable 102 and abutting the cable 102, respectively. The cable 102 is arranged to communicate an electric current 16 from the power source 12 (shown in FIG. 1) to the electrical device 14 (shown in FIG. 1) and includes a cable conductor 108, a cable insulator 110, and a cable shield 112. The field grading member 100 is arranged to regulate the electric field 20 within the cable insulator 110 when directly abutting, or integrated into, the cable 102.

As shown in FIG. 2, the cable conductor 108 extends along a conductor axis 114 and is formed from an electrically conductive conductor material 116. The conductor material 116 is selected to communicate the electric current 16 carried by the conductor 108. In certain examples the conductor material 116 includes copper or a copper alloy.

The cable insulator 110 extends along the cable conductor 108, is fixed to the cable conductor 108, and is formed from an electrically insulative insulator material 118. The insulator material 118 electrically isolates the cable conductor 108 from the external environment 22 and is selected to accommodate the electric field 20 associated with the current 16 flowing through the cable conductor 108. In certain examples the insulator material 118 includes a cross-linked polyethylene material.

The cable shield 112 extends partially along the cable insulator 110, is fixed along a shielded portion 122 of the cable 102 and is absent from an unshielded portion 124 and is additionally formed from an electrically conductive shield material 126. The shield material 126 is selected to regulate the electric field 20 within the shielded portion 122 of the cable 102, e.g., by distributing the electric field 20 within the cable conductor 108 and/or the cable insulator 110. In certain examples the cable shield 112 is electrically connected to a ground terminal 24.

As will be appreciated by those of skill in the art in view of the present disclosure, shielding the cable 102 with the cable shield 112 can limit the electrical stress exerted by the electric field 20 on the cable insulator 110 by controlling uniformity of the electric field 20 axially within the insulator 110 along the shielded portion 122 of the cable 102. This is indicated schematically in FIG. 2 with the unregulated electric field lines 28, which extend axially within the cable insulator 110 and along the shielded portion 122 of the cable 102.

As will also be appreciated by those of skill in the art in view of the present disclosure, the effect that the cable shield 112 has on the electric field 20 changes at locations where the cable shield has been removed. In this respect, as shown within the circled portion 26 of the unregulated field lines 28 within the cable insulator 110, the electric field 20 radiates radially outward, becomes relatively non-uniform, and increases in peak intensity. This is indicated schematically in FIG. 2 with the spacing between unregulated electric field lines 28 with, which extend radially within the insulator 110 and along the unshielded portion 124 of the cable 102. As a consequence, electrical stress can be relatively high at a terminal location 128 of the cable shield 112 where the cable shield 112 has been removed. The electrical stress associated with the electric field 20 varies in peak intensity according to voltage applied to the cable 102 and, in some cables, can be of magnitude sufficient to cause electrical breakdown of the insulator material forming the cable insulator. To limit the electrical stress within cable insulator 110 the field grading member 100 is provided.

As shown in FIG. 3, when assembled to the cable 102 the cable insulator 110 underlays the field grading member 100 and electrically separates the field grading member 100 from the cable conductor 108. More specifically, the field grading member 100 overlays the unshielded portion 124 of the cable 102, the cable insulator 110 thereby underlaying the field grading member 100 such that the field grading member 100 distributes the electric field 20 axially along the conductor axis 114. In certain examples the field grading member 100 uniformly distributes and/or reduces the peak magnitude the electric field 20 within the cable insulator 110 associated with the current flow 16 through the cable conductor 108, as shown by the distribution of the regulated electric field lines 30 of the electric field 20 within a circled region 32 within the cable insulator 110 relative to the circled region 26 (shown in FIG. 2). Uniformly distributing and/or reducing the peak magnitude the electric field 20 within the cable insulator 110 associated with the current flow 16 through the cable conductor 108 reduces electrical stress within the insulator body 110, allowing the cable insulator 110 to be relatively small for a given voltage (and electric field magnitude) and/or have a higher voltage rating in comparison to cables not employing the field grading member 100.

Figure 4:
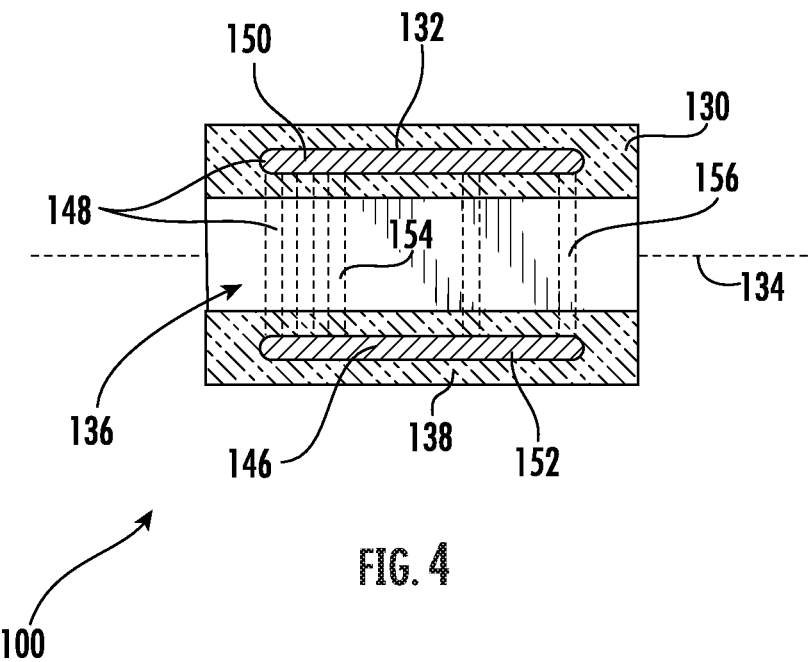
FIG. 4 is a schematic cross-sectional view of the field grading body of FIG. 1 according to an example, showing wires of a conductor body encapsulated within an insulating body of the field grading body.

With reference to FIG. 4, the field grading member 100 is shown. The field grading member 100 generally includes an insulating body 130 and a conductive body 132 and in this respect is a composite field grading member. The insulating body 130 extends along a regulation axis 134. The conductive body 132 is encapsulated within the insulating body 130 and defines a conductive network 136 therein to regulate an electric field within an underlying insulator from current flowing through a conductor, e.g., the electric field 20 (shown in FIG. 2) within the insulator 110 (shown in FIG. 2) from current flowing through the cable conductor 108 (shown in FIG. 2), and along the regulation axis 134.

The insulating body 130 is formed from an electrically insulative insulating body material 138. In certain examples the insulating body material 138 includes a polymer. Forming the insulating body 130 with a polymer allows the conductive network 136 to have reduced conductivity in relation to an uncoated conductive network 136 while maintaining a controlled conductive network throughout the insulating body 130 through distribution of the conductive network 136 within the insulating body 130 to regulate the electric field 20 (shown in FIG. 2). Forming the insulating body 130 with a polymer also enables the insulating body material 138 to conform the structure of the conductive network 136, limiting voids and promoting coverage of the conductive network 136 with the insulating body material 138. Examples of suitable polymers include ethylene propylene diene rubber (EPDM), silicone rubbers, and thermoplastics such as polyethylene and polypropylene and mixes of each.

The conductive body 132, and more specifically the conductive network 136, is encapsulated within the insulating body 130 and is formed from an electrically conductive network material 146. The network material 146 can include, for example, copper or aluminum by way of non-limiting example. In certain examples the conductive network 136 forming the conductive body 132 can be electrically continuous. In accordance with certain examples the conductive body 132 can be a one-piece monolithic structure. It is also contemplated that the conductive network 136 can be formed from a finite group of structures mechanically coupled to one another and fixed to one another by the insulating body material 138. Employment of a monolithic or finite number of structures allows the electric field regulation provided by the conductive network 136 to be tuned by selection of the shape of the conductive body 132.

In the example illustrated in FIG. 4 the conductive body 132 includes a plurality of wires 148, e.g., metal wires. The plurality of wires 148 are electrically connected to one another to define the conductive network 136. In this respect the conductive body 132 includes an axially-extending first wire 150 and an axially-extending second wire 152. The axially-extending second wire 152 is electrically connected to the axially-extending first wire 150, is circumferentially offset from the axially-extending first wire 150 about the regulation axis 134 and extends axially along the regulation axis 134. Although the plurality of wires 148 is shown and described as having a certain number of axially-extending wires it is to be understood and appreciated that the conductive body 132 can have fewer or additional axially-extending wires and remain within the scope of the present disclosure.

It is also contemplated that one or more of the plurality of wires 148 can be axially offset from another of the plurality of wires 148. In this respect the conductive body 132 in the illustrated example includes a circumferentially-extending first wire 154 and a circumferentially-extending second wire 156. The circumferentially-extending second wire 156 is axially offset from the circumferentially-extending first wire 154 along the regulation axis 134 and is electrically connected to the circumferentially-extending first wire 154. In certain examples the circumferentially-extending first wire 154 and the circumferentially-extending second wire 156 share a common diameter to provide consistent (or substantially equivalent) electric field regulation along the axial segment spanned by the circumferentially-extending first wire 154 and the circumferentially-extending second wire 156. In accordance with certain examples the circumferentially-extending first wire 154 and the circumferentially-extending second wire 156 can have different diameter, the different diameters providing graduated electric field regulation along the axial segment spanned by the circumferentially-extending first wire 154 and the circumferentially-extending second wire 156. Although the plurality of wires 148 is shown and described as having a certain number of circumferentially-extending wires it is to be understood and appreciated that the conductive body 132 can have fewer or additional circumferentially-extending wires and remain within the scope of the present disclosure.

Figure 5:
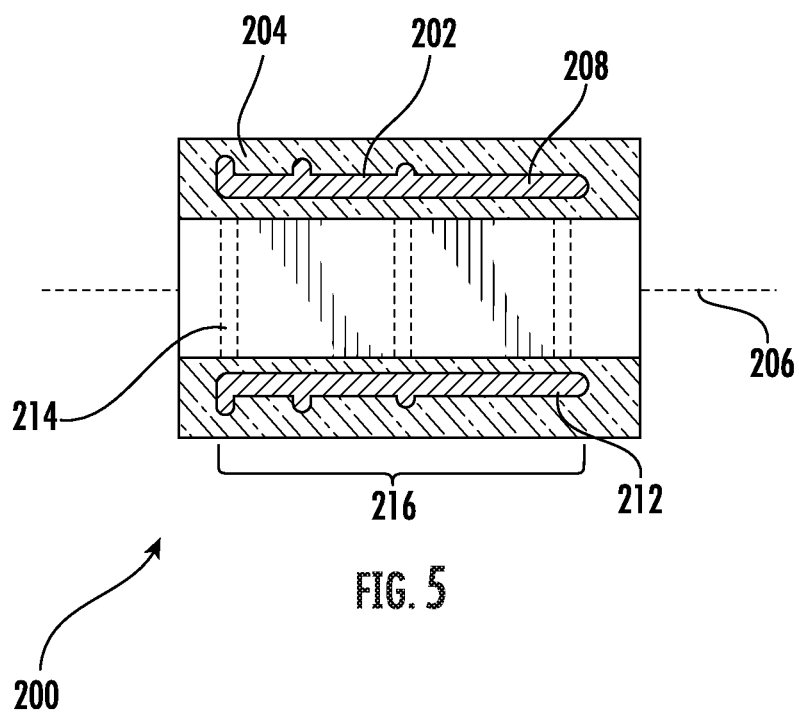
FIG. 5 is a schematic cross-sectional view of the field grading body of FIG. 1 according to another example, showing wire mesh of a conductor body encapsulated within an insulating body of the field grading body.

With reference to FIG. 5, a field grading member 200 is shown. The field grading member 200 is similar to the field grading member 100 (shown in FIG. 1) and additionally includes a conductive body 202 and an insulating body 204. The insulating body 204 extends longitudinally along a regulation axis 206. The conductive body 202 is in turn encapsulated within the insulating body 204 and defines a conductive network within the insulating body 204 to regulate an electric field within an underlying insulator from current flowing through a conductor, e.g., the electric field 20 (shown in FIG. 2) within the insulator 110 (shown in FIG. 2), along the regulation axis 206.

In the illustrated example the conductive body 202 includes a branched wire 208. The branched wire 208 includes a longitudinal member 212 and a radial member 214. The longitudinal member 212 extends longitudinally within the insulating body 204 and along the regulation axis 206. The radial member 214 extends radially within the insulating body 204 relative to the regulation axis 206 and is electrically connected to the longitudinal member 212. It is contemplated that the branched wire 208 vary in density 216 along the regulation axis 206, variation of the density 216 of the branched wire 208 selected to regulate distribution of the electric field 20 (shown in FIG. 2) along the unshielded portion 124 (shown in FIG. 2) of the cable 102 (shown in FIG. 1). In certain implementations the density 216 of the branched wire 208 varies according to strength of the electric field 20 within the underlying insulator 110 (shown in FIG. 2) to limit electric stress within the insulator 110 associated with the electric current 18 (shown in FIG. 2) flowing through the conductor 108.

Figure 6:
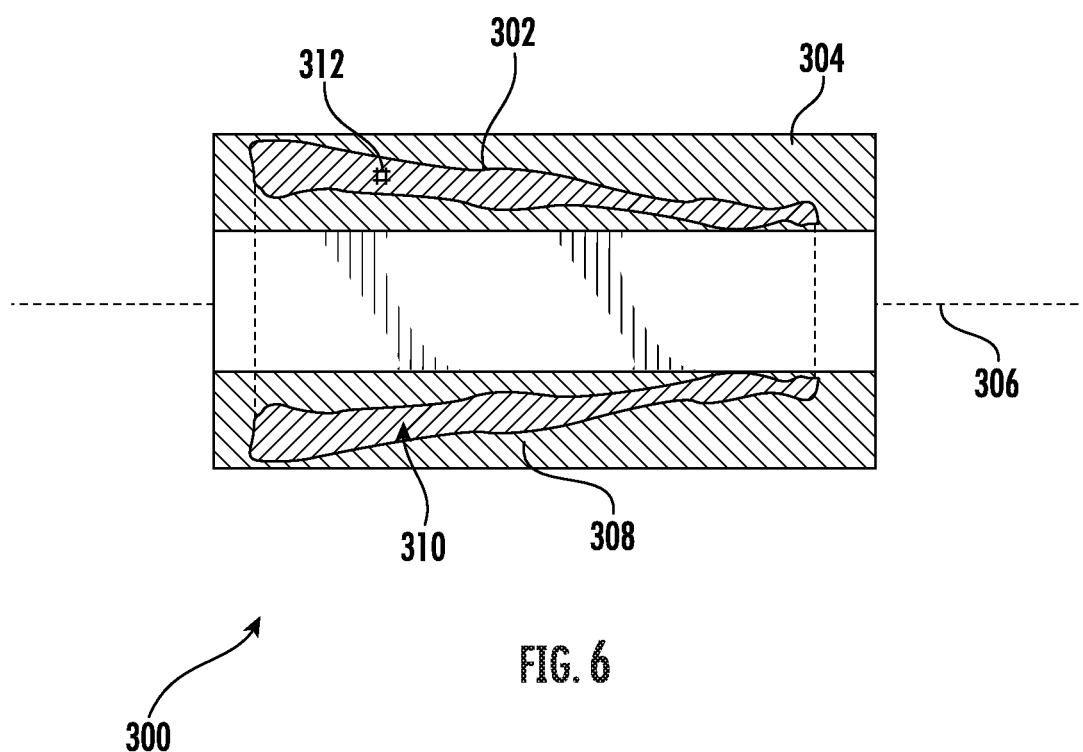
FIG. 6 is a schematic cross-sectional view of the field grading body of FIG. 1 according to another example, showing wire mesh of a conductor body encapsulated within an insulating body of the field grading body.

With reference to FIG. 6, a field grading member 300 is shown. The field grading member 300 is similar to the field grading member 100 (shown in FIG. 1) and additionally includes a conductive body 302 and an insulating body 304. The insulating body 304 extends longitudinally along a regulation axis 306. The conductive body 302 is encapsulated within the insulating body 304 and defines a conductive network 310 within the insulating body 304 to regulate an electric field within an underlying cable insulator from current flowing through a cable conductor, e.g., the electric field 20 (shown in FIG. 2) within the cable insulator 110 (shown in FIG. 2), along the regulation axis 306.

In the illustrated example the conductive body 302 includes a wire mesh structure 308. The wire mesh structure 308 varies in density 312 along the regulation axis 306, variation of the density 312 of the wire mesh structure 308 selected to regulate distribution of the electric field 20 (shown in FIG. 2) along the unshielded portion 124 (shown in FIG. 2) of the cable 102 (shown in FIG. 1). In certain implementations the density 312 of the wire mesh structure 308 varies according to strength of the electric field 20 within the underlying insulator 110 (shown in FIG. 2) to limit electric stress within the insulator 110 associated with the electric current 18 (shown in FIG. 2) flowing through the conductor 108.

Figure 7:
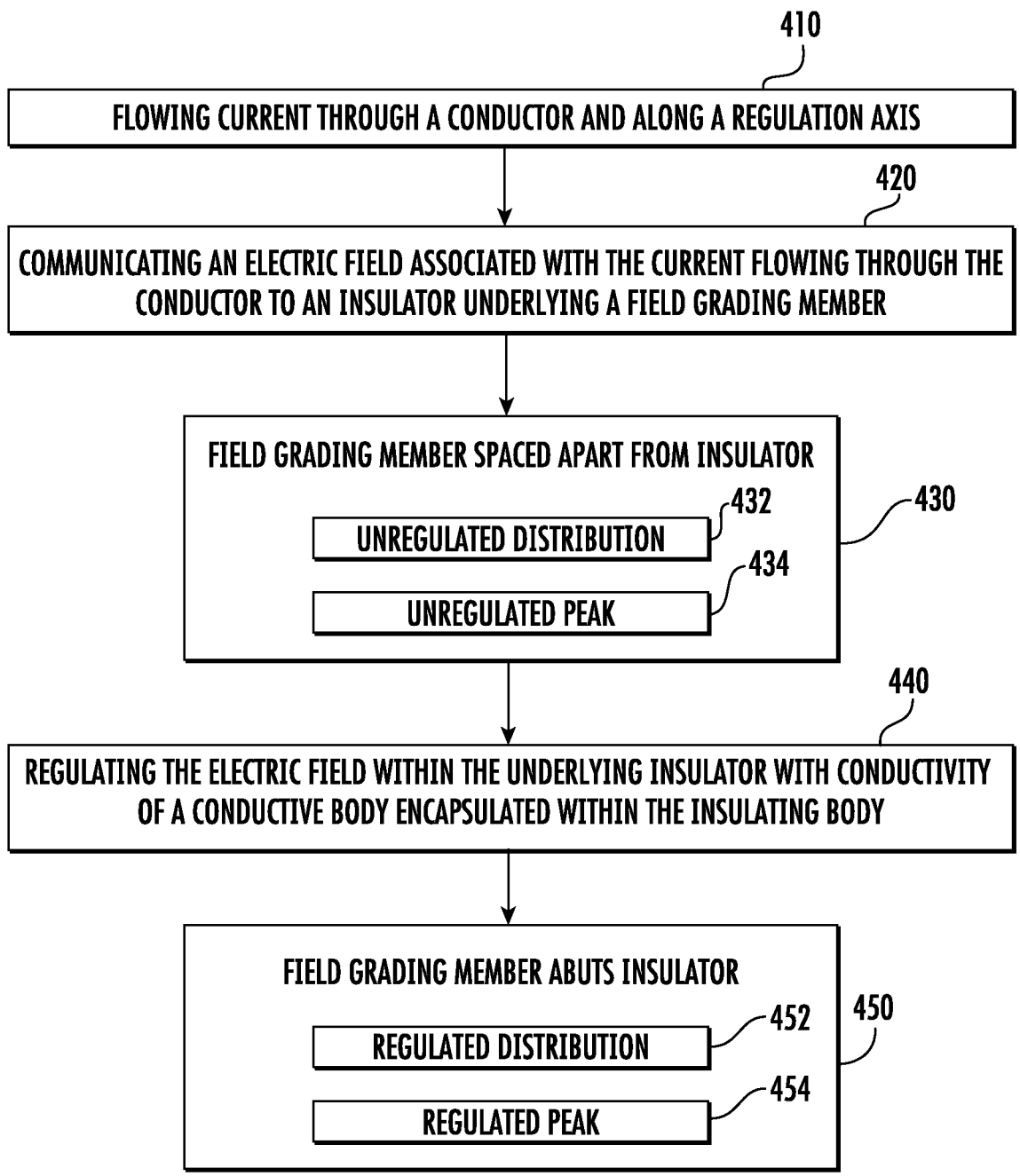
FIG. 7 is a block diagram of a method of regulating electric field within a cable insulator, showing steps of the method according to a non-limiting example of the method.

With reference to FIG. 7, a method 400 of regulating an electric field, e.g., the electric field 20 (shown in FIG. 2), is shown. As shown with box 410 the method 400 includes flowing current, e.g., the electric current 18 (shown in FIG. 2), through a conductor along a regulation axis, e.g., the conductor 108 (shown in FIG. 2) along the regulation axis 134 (shown in FIG. 2). The flow of electric current through the conductor generates an electric field in an insulator surrounding the conductor and underlying the field grading member, e.g., the insulator 110 (shown in FIG. 2) underling a field grading member 100 (shown in FIG. 1), as shown with box 420. The electric field has an unregulated distribution and an unregulated peak when field grading member is spaced apart from the insulator, as shown with boxes 430-434. The electric field has a regulated distribution and a regulated peak when field grading member abuts the insulator, the regulated distribution more uniform than the unregulated distribution and the regulated peak lower than the unregulated peak, as shown with boxes 430-434.

Current flow through cabling in power distribution systems can induce an electric field with a radial component in the reinforced insulation in locations where the shield in removed from the cable, e.g., at joints and terminations or locations where the cable has been repaired. In some power distribution systems, it can be necessary to grade the electric field at such locations, generally by employing capacitive grading elements or resistive grading elements. Capacitive grading elements are generally employed in high voltage applications, typically with a stress-cone formed from a two-component rubber. Resistive grading elements are generally employed in low and medium voltage applications, typically with cylindrical sleeve having high conductivity, which may be field dependent.

In examples described herein field grading member include a branched metal wire encapsulated within an insulating polymer body. In certain examples the branched metal wire has reduced electrical conductivity compared to an uncoated metal wire. In accordance with certain examples the branched metal wire is arranged to maintain a controlled conductive network throughout an electrically insulating polymeric matrix via the concentration of the branching metallic wires within the polymeric matrix to regulate electrical or thermal field within the insulating layer of an underlying cable. For example, the concentration, e.g., density, of the branching metallic wires along a regulation axis can correspond to strength of an unregulated electric field within an insulator of the underlying cable along the regulation axis.

The term "about" is intended to include the degree of error associated with measurement of the particular quantity based upon the equipment available at the time of filing the application.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary example or examples, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular example disclosed as the best mode contemplated for carrying out this present disclosure, but that the present disclosure will include all examples falling within the scope of the claims.

What is claimed is:

1. A field grading member, comprising:
   an electrically insulating body extending along a regulation axis;
   an electrically conductive body encapsulated within the insulating body and defining a conductive network therein, wherein the electrically conductive body resides completely within the insulating body, wherein the electrically conductive body varies in density along the regulation axis to regulate an electric field within an underlying cable insulator from current flowing through a cable conductor along the regulation axis, wherein the electrically conductive body is non-overlapping upon itself, wherein the conductive body is insulated from directly contacting an underlying cable;
   wherein the field grading member overlays a cable and a cable shield, wherein the cable shield extend along the regulation axis, wherein the cable shield is removed along a portion of the cable insulator such that the field grading member abuts the cable insulator, wherein the cable shield is grounded, wherein the field grading member is disposed on an outermost surface of the cable shield, wherein the outermost surface of the cable shield is opposite a surface of the cable shield that contacts the cable insulator.

2. The field grading member of claim 1, wherein the conductive network includes a wire.

3. The field grading member of claim 2, wherein the wire is a first wire and further comprising a second wire electrically connected to the first wire.

4. The field grading member of claim 3, wherein the second wire is circumferentially offset from the first wire.

5. The field grading member of claim 3, wherein the second wire is axially offset from the first wire about the regulation axis.

6. The field grading member of claim 1, wherein the conductive network includes a branched wire.

7. The field grading member of claim 6, wherein the branched wire includes a longitudinal member extending longitudinally within the insulating body and along the regulation axis.

8. The field grading member of claim 6, wherein the branched wire includes a radial member extending radially within the insulating body relative to the regulation axis.

9. The field grading member of claim 6, wherein the branched wire varies in density along the regulation axis.

10. The field grading member of claim 1, wherein the conductive body includes wire mesh structure.

11. The field grading member of claim 10, wherein the wire mesh structure varies in density along the regulation axis.

12. The field grading member of claim 11, wherein density of the wire mesh structure varies according to strength of an unregulated electric field within the underlying insulator at a rated voltage of the cable conductor.

13. The field grading member of claim 1, wherein the conductive body completely encapsulated within the insulating body has reduced conductivity relative to a conductive body not encapsulated within the insulating body.

14. A cable, comprising:
   the cable conductor;
   the cable insulator extending about the conductor,
   wherein the cable is coupled to the field grading member as recited in claim 1, wherein the cable insulator underlays the field grading member and electrically separates the field grading member from the cable conductor, and wherein the current flowing through the cable conductor communicates the electric field to the cable insulator.

15. The cable of claim 14, wherein the cable includes a termination or a joint, wherein the field grading member forms a portion of the termination or the joint.

16. A field grading member, comprising:
   an electrically insulating body extending along a regulation axis;
   an electrically conductive body encapsulated within the insulating body and defining a conductive network therein, wherein the electrically conductive body does not extend outside of the insulating body, wherein the electrically conductive body varies in density along the regulation axis to regulate an electric field within an underlying cable insulator from current flowing through a cable conductor along the regulation axis, wherein the electrically conductive body is non-overlapping upon itself, wherein the conductive body is insulated from directly contacting an underlying cable; and
   wherein the field grading member overlays a cable and a cable shield, wherein the cable shield extends along the regulation axis, wherein the cable shield is removed along a portion of the cable insulator such that the field grading member abuts the cable insulator, wherein the cable shield is grounded, wherein the conductive network includes a branched wire, wherein the branched wire varies in density along the regulation axis,
   wherein the density of the branched wire varies according to strength of an unregulated electric field within the underlying insulator at a rated voltage of the cable conductor.

17. A method of regulating electric field, comprising:
   at a field grading member including an electrically insulating body extending along a regulation axis and an electrically conductive body encapsulated within the insulating body, wherein the electrically conductive body does not extend outside of the insulating body, wherein the electrically conductive body is non-overlapping upon itself and the electrically conductive body defining a conductive network therein, wherein the conductive body is insulated from directly contacting an underlying cable;

flowing current through a cable conductor and along the regulation axis;

providing and grounding a cable shield extending along the regulation axis;

communicating an electric field associated with the current flowing through the cable conductor to a cable insulator underlying the field grading member, wherein the cable shield is removed along a portion of the cable insulator such that the field grading member abuts the cable insulator, wherein the field grading member is disposed on an outermost surface of the cable shield, wherein the outermost surface of the cable shield is opposite a surface of the cable shield that contacts the cable insulator; and regulating the electric field within the underlying cable insulator with conductivity of the conductive body encapsulated within the electrically insulating body.

18. The method of claim 17, wherein the electric field has an unregulated peak within the insulator when the field grading member is spaced apart from the cable insulator, wherein the electric field has a regulated peak within the cable insulator when the field grading member abuts the cable insulator, wherein the regulated peak is smaller than the unregulated peak.

19. The method of claim 17, wherein the electric field has an unregulated distribution within the cable insulator when the field grading member is spaced apart from the cable insulator, wherein the electric field has a regulated distribution within the cable insulator when the field grading member abuts the cable insulator, and wherein the regulated distribution is more uniform than the unregulated distribution.

* * * * *